US006266973B1

(12) United States Patent
    Salmons

(10) Patent No.:     US 6,266,973 B1
(45) Date of Patent:     Jul. 31, 2001

(54) REFRIGERATION SYSTEM

(75) Inventor: James Clyde Salmons, Quincy, MO (US)

(73) Assignee: Preston Refrigeration, Kansas City, KS (US)

( * ) Notice: Subject to any disclaimer, the term of this patent is extended or adjusted under 35 U.S.C. 154(b) by 0 days.

(21) Appl. No.: 09/474,495

(22) Filed: Dec. 29, 1999

(51) Int. Cl.⁷ .................................................. F25D 17/04
(52) U.S. Cl. ................................................. 62/416; 62/419
(58) Field of Search ..................... 62/416, 419, 259.1, 62/414

(56) References Cited

U.S. PATENT DOCUMENTS

| | | | |
|---|---|---|---|
| 2,315,285 | * 3/1943 | Dennington | 62/89 |
| 2,971,350 | * 2/1961 | Mills | 62/272 |
| 3,501,926 | * 3/1970 | Smith | 62/263 |
| 4,561,265 | * 12/1985 | Cardiff | 62/419 |

FOREIGN PATENT DOCUMENTS

625632  *  4/1927  (FR) .......................................  62/419

* cited by examiner

*Primary Examiner*—William Doerrler
*Assistant Examiner*—Melvin Jones
(74) *Attorney, Agent, or Firm*—Polsinelli Shalton & Welte, P.C.

(57) ABSTRACT

The present invention relates to a method and device for use in a refrigeration unit, whereby the invention causes air to flow in a circular motion whereby the air flows in an initial downward arc before flowing upward. Importantly, the present invention relates to the implementation of a wall in a refrigeration unit to cause the air to circulate in the desired motion, with such flow reducing condensation on the ceiling of the refrigeration unit and cooling animal carcasses in the refrigeration unit at a faster rate.

10 Claims, 3 Drawing Sheets

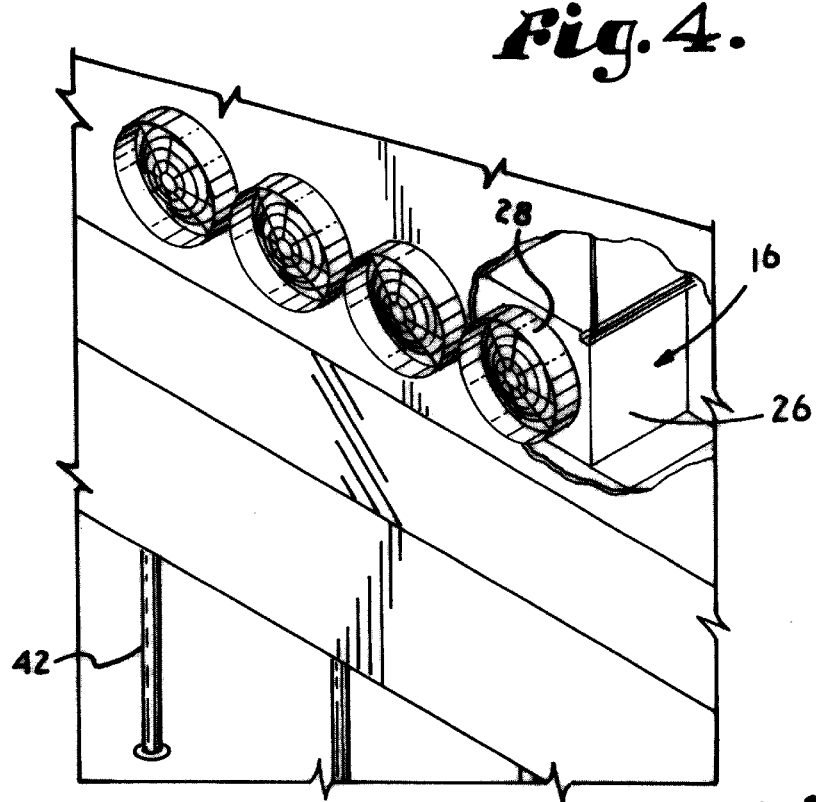
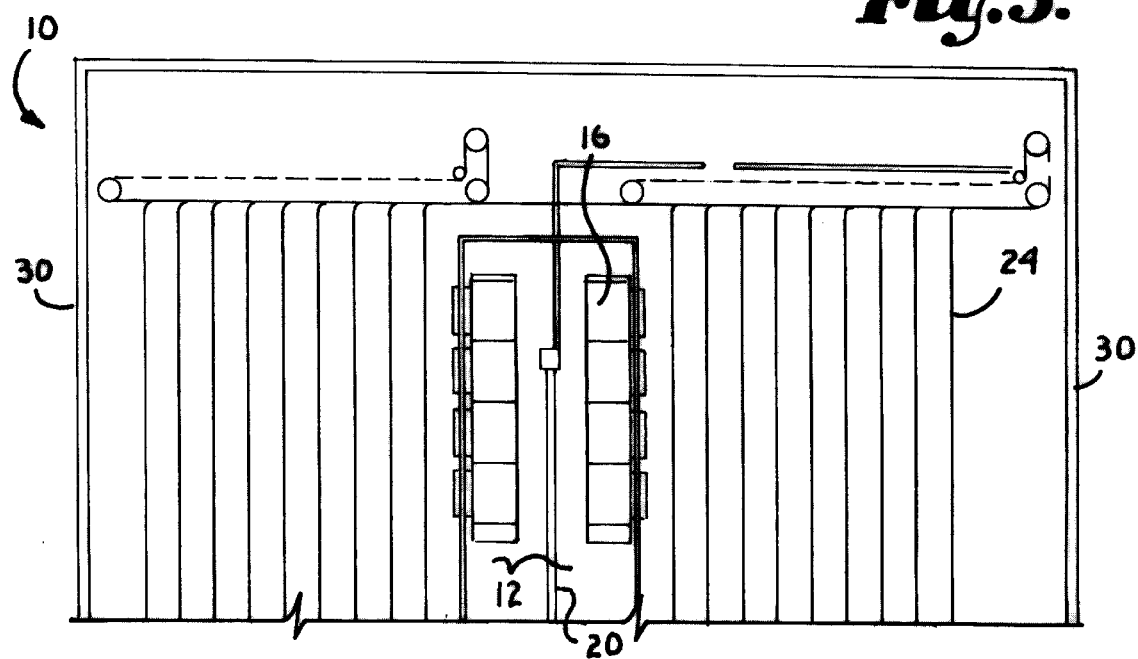

REFRIGERATION SYSTEM

FIELD OF INVENTION

The present invention relates to a method for redirecting airflow in a refrigeration unit and a wall for accomplishing such method. More particularly, the present invention relates to the placement of the wall in a position whereby airflow is directed in a circular motion having an initial downward arc, which reduces condensation collection on the ceiling of the refrigeration unit.

BACKGROUND OF INVENTION

Cattle and hogs are typically slaughtered at a packing plant. When the animals are slaughtered, various parts of the animal are removed, with the removal occurring along an assembly line. Eventually a carcass remains, which will then be butchered to provide cuts of meat for human consumption. Typically, the carcasses are sold to butcher shops where a butcher will then carve up the carcass to produce the various cuts of meat. In order to ship the carcasses, it is necessary to cool them to a temperature just above freezing. The cooling process is accomplished in a large refrigeration unit whereby the carcasses are mounted on meat hooks attached to conveyors. The carcasses are attached to the meat hooks and then conveyed into the refrigeration unit. Once located in the refrigeration unit, there is typically a total of at least 60 carcasses held by the conveyor lines. As such, the refrigeration unit is a large room that is typically at least 120 feet long. Hot box cooling units suspended from the ceiling in the refrigeration unit, and located near a side wall, are used to cool air which in turn lowers the temperature of the carcasses.

A typical refrigeration unit will be 120 feet by 48 feet, with the unit containing 6 hot box units. The hot box units include a cooling member or refrigeration unit, and three to 4 fan members attached thereto, so that as air is cooled the fan blows the cold air away from the hot box unit causing the air to circulate and cool the carcasses. As the carcasses are being cooled by the chilled air, water or mist is sprayed onto the carcasses to prevent dehydration of the meat. The heat of the carcasses causes some of the water to evaporate. The evaporated water is then conveyed throughout the refrigeration unit by the circulating air. As such, some of the water will condense and collect on the ceiling of the refrigeration unit.

The circulated air in the refrigeration unit generally follows one of two pathways. As the air is blown away from the hot box unit, it will follow a circular course whereby the air moves outward and down over the carcasses and back to the hot box unit, or the air follows an alternative circular course where the air moves out away from the hot box unit, up towards the ceiling and back to the hot box unit. The upward movement of the air results in some of the water vapor collecting on the ceiling.

As the moisture continues to collect on the ceiling, eventually a sufficient amount of moisture will accumulate, and the water will begin to drip. As the water drips, it will contact the piping and other structures located in the refrigeration unit above the carcasses. Generally, the piping and other structures are rusty, or at least slightly oxidized, so that as the drippings contact these structures, the water becomes contaminated. The contaminated water then continues its downward course so that the drippings will contact the carcasses. If the drippings, which are contaminated, contact the carcasses, contamination of the carcasses occurs, and they become unsaleable. As a result of contamination, meat inspectors for the USDA (United States Department of Agriculture) often force the closing of the refrigeration unit to eliminate condensation. This is expensive and very costly to the owners of the meat packing plant, because production lines are effectively shut down. Thus, it is desired to have a device or method which prevents water from readily condensing on the ceiling of the refrigeration unit and, more particularly, the formation of water drippings that are contaminated.

Another problem associated with the collection of moisture on the refrigeration unit ceiling is that to prevent such formation, it is often necessary to blow the cooled air at a reduced velocity. Faster air flow results in rapid cooling, which increases the water vaporization rate. This will, in turn, cause increased condensation, thereby increasing the likelihood of the refrigeration unit being closed. Thus, the traditional practice has been to slowly cool the carcasses to prevent condensation formation on the ceiling. Typically, the carcasses will occupy the refrigeration unit for approximately 48 hours. Such a long occupation time increases costs because space is occupied for a longer period of time, and more energy is required to cool the carcasses for such a long period of time. As such, it is preferred if the cooling time for the carcasses is reduced.

Thus, it is desired to have a method or device which prevents the formation or at least significantly decreases the formation of condensation on the ceiling of the refrigeration unit. It is additionally preferred to have a method or device which can cool the carcasses in a shorter period of time.

SUMMARY OF INVENTION

The present invention relates to a method and device or member designed to alter the flow of air circulating in a refrigeration unit. The present invention also relates to a refrigeration unit having a construction that causes air to generally flow in a circular motion whereby the air initially follows a downward path before turning upward. More specifically, the present invention is designed to substantially prevent circulating air from initially moving upward to contact the ceiling of the refrigeration unit before circulating back to the hot box unit where the air is cooled. As such, the present invention is designed to cause the air to circulate primarily in a manner whereby the air is blown away from the hot box cooling unit and then initially descends downward before circulating back to the hot box unit for cooling. Redirecting the air flow will substantially prevent the collection of moisture on the ceiling of the refrigeration unit which will, in turn, reduce the likelihood of contaminant water formation. As such, any device or method which prevents the substantial formation of condensates on the ceiling of a refrigeration unit can be used.

The preferred method involves erecting a wall member that will contact the hot box or cooling units of the refrigeration unit. The wall unit will eliminate the open space between the hot box units and the ceiling, as well as the open space between hot box units. Preferably the wall will extend downward from the hot box units to a point located midway between the hot box units and the floor of the refrigeration unit. By eliminating the space above and along the sides of the hot box units, the air is forced to circulate downward before flowing back to the hot box. Essentially, the wall forces the air to move in a direction whereby a circular path is followed with the path turning downward initially, as opposed to upward. Advantageously, this prevents the collection of condensates on the ceiling of the refrigeration unit.

The wall is a solid structure, without voids or holes. Further, the wall extends downward to a point midway between the hot box units and the floor. Any material that prevents ready attachment of animal waste and offal to the wall and adequately blocks air flow can be used to make the wall.

The refrigeration unit will be any room used for cooling animal carcasses, with the room having the hot box or cooling units located proximal to one of the walls or sides of the refrigeration unit. As such, the hot box units will blow the air in a direction designed to cause the air to travel a path that transverses the majority of the width or length of the room. As such, it is preferred for the refrigeration unit to have four walls that form a rectangular room, with the hot box units located near one of the side walls. Importantly, the refrigeration unit will have a third side wall that does not extend to the floor of the refrigeration units, with the third side wall in contact with the hot box units. As such, the present refrigeration unit will have an additional wall that alters air flow, which is believed not to be found in other similar types of refrigeration units.

The present wall device, refrigeration unit, and method for redirecting airflow impart a number of advantages. Of primary importance is the fact that because the air flow is redirected, collection of water vapor on the ceiling of the refrigeration unit is substantially reduced. This, in turn, is advantageous because the formation of contaminated water which causes the shut-down of a packing plant is substantially reduced. Also, the present invention is advantageous because the carcasses can be cooled at a faster rate, as there is a lesser concern regarding condensation formation. This, in turn, lowers the cost associated with cooling the carcasses. Thus, the present invention results in a significant cost savings to the user because the carcasses are cooled at a faster rate, and the packing plant has to be shut down fewer times, which means an increased cost savings.

BRIEF DESCRIPTION OF THE DRAWINGS

FIG. 3 is a top plan view of a refrigeration unit showing the hot box units and conveyor belts; and, FIG. 4 is a cut-away view showing the hot box units and the wall.

DETAILED DESCRIPTION

Figure 1:
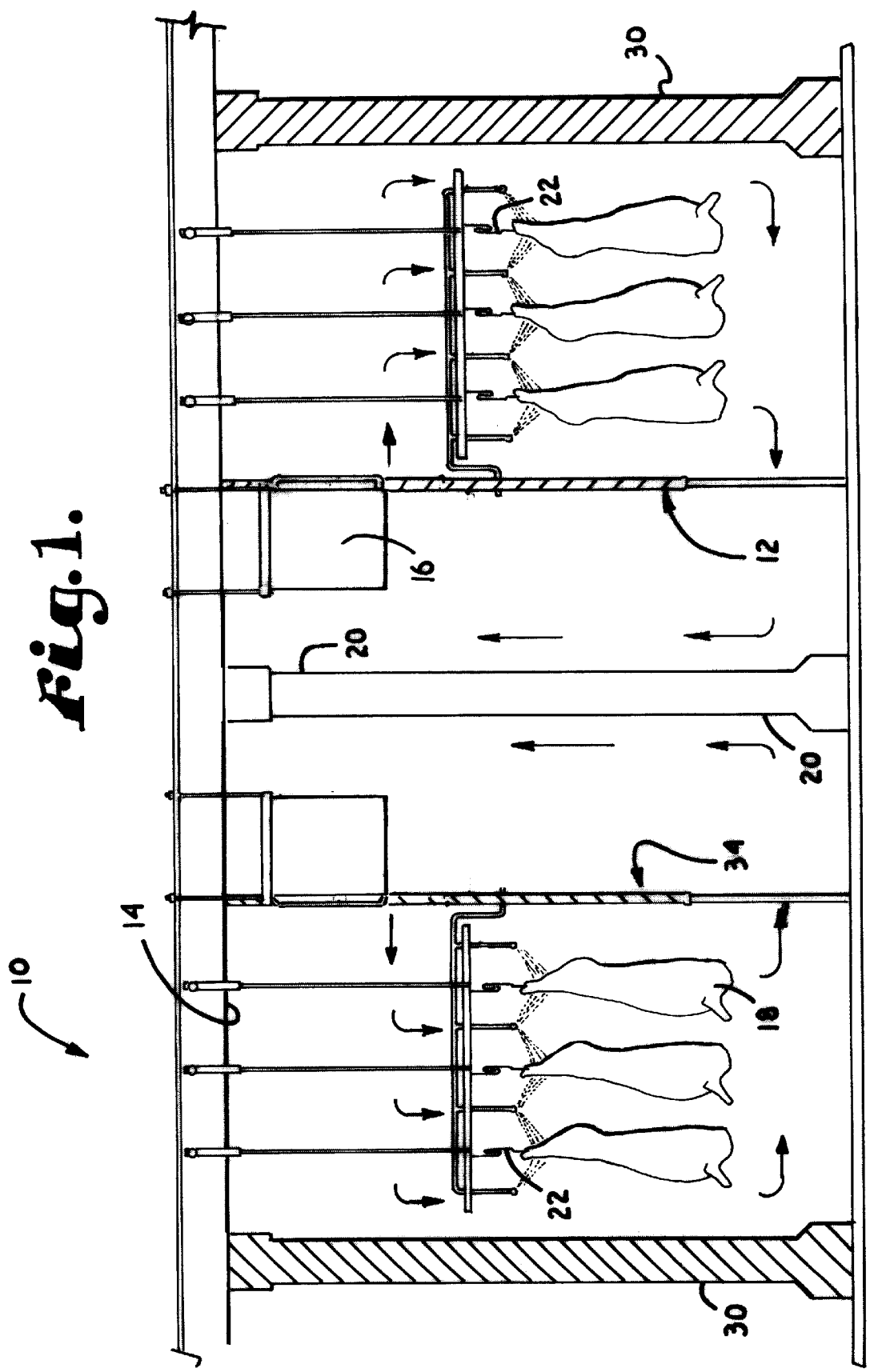
FIG. 1 is a front view of a refrigeration unit having a wall for redirecting airflow in the refrigeration unit.

The present invention relates to a method for preventing water condensation, redirecting airflow, and cooling animal carcasses in a lesser amount of time in a refrigeration unit 10, shown in FIGS. 1, 2, 3, and 4, and the refrigeration unit. The present invention also relates to a wall 12 placed in such refrigeration unit 10 whereby said wall 12 causes the redirection of airflow which, in turn, substantially reduces condensation and the collection of moisture on the ceiling 14 of such refrigeration unit. The wall 12 is located in a position proximal to cooling units 16 found in the refrigeration unit, with the wall occupying vertical space in at least the upper half of the refrigeration unit. This substantially prevents circular flow of air whereby air that has passed over animal carcasses 18 then circulates in a direction to contact the ceiling 14 of the refrigeration unit 10.

A refrigeration unit 10, like the one shown in FIGS. 1, 2, 3, and 4, is used in slaughter houses and meat packing plants.

The refrigeration unit 10 typically is a large square or rectangular room capable of holding numerous animal carcasses 18, such as cattle carcasses. A typical refrigeration unit 10 will have a pair of side-by-side rooms separated by an insulated wall panel 20. The carcasses 18 are mounted on meat hooks 22 attached to conveyor belt systems 24, shown in FIGS. 1, 2, and 3, which pass through the refrigeration unit. When activated, the conveyor belt system 24 transports the carcasses 18 into the refrigeration unit 10. Once the carcasses are cooled, they are then conveyed out of the refrigeration unit. While being cooled, the carcasses are sprayed with water, shown in FIGS. 1 and 2, to prevent dehydration.

Hot boxes 16 are cooling devices used to cool the air, with the hot boxes including a cooling unit 26 and a fan 28 that blows the cooled air over the carcasses 18, thereby causing the room to be refrigerated. A typical refrigeration unit 10 is more clearly shown in FIG. 3, where the hot box units 16 are located proximal to the insulated wall panel 20. The conveyor belt system 24 is located between the hot box units 16 and the outside wall 30 of the refrigeration unit 10, which is located opposite the insulated wall panel 20. Because the refrigeration unit typically has a pair of side-by-side rooms, there will be two outside or side walls, but they are both referred to as wall 30. The side walls, which include walls 30 and insulated wall 20, are perpendicular to two end walls, with such construction forming the refrigeration unit. Hooks 22 are coupled to the conveyor belts 24 with the hooks 22 used to hold the carcasses while they are cooled or moved. When the carcasses are located in the refrigeration unit 10, they are brought in at room temperature and then left in the refrigeration unit until cooled to a desired temperature. Once the carcasses are cooled, the conveyor belt system is activated, and the carcasses are removed from the refrigeration unit 10.

Figure 2:
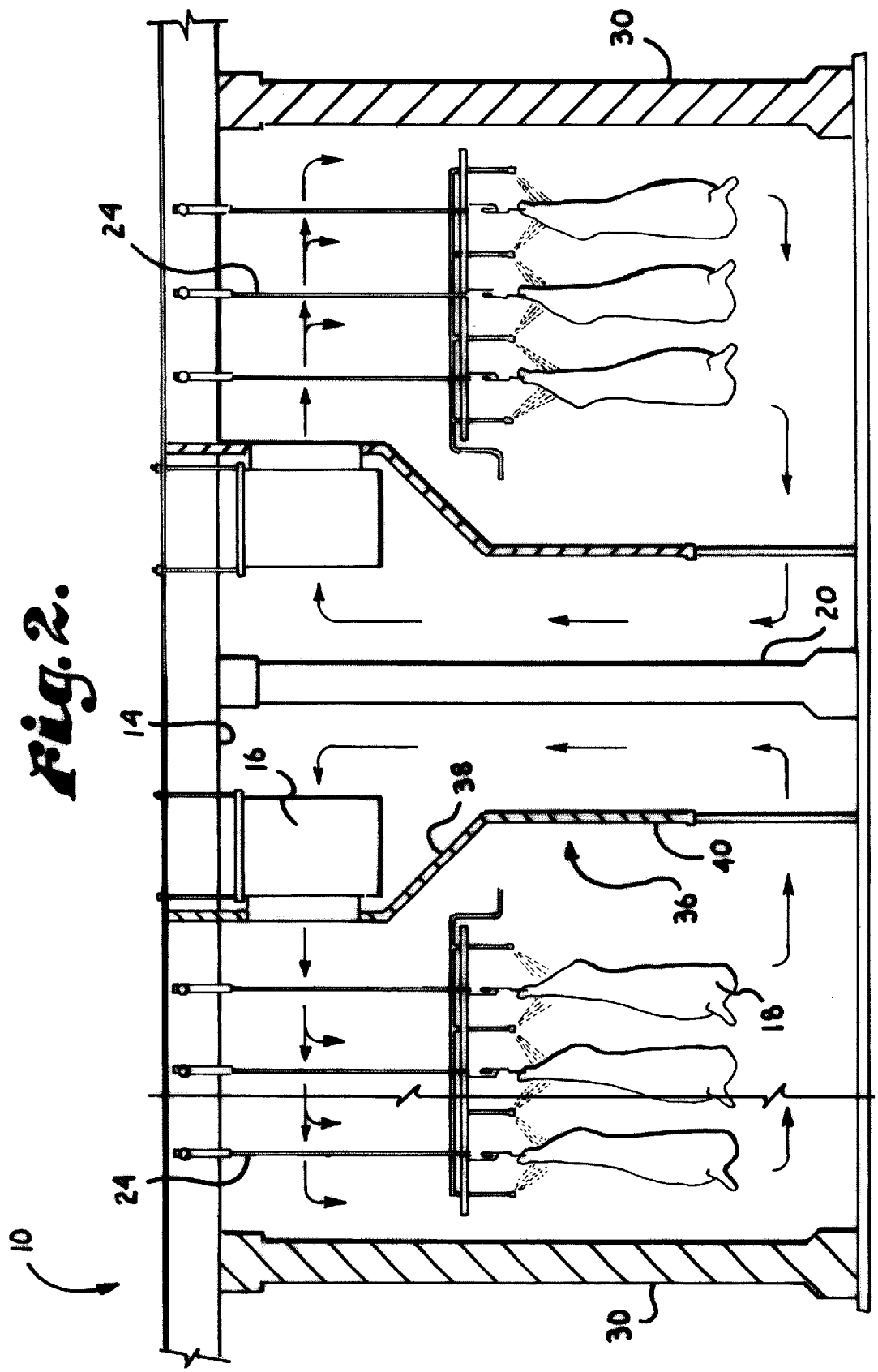
FIG. 2 is a front view of a refrigeration unit having a wall which has a two part construction, an angled portion and a substantially vertical portion, with such wall for redirecting airflow in the refrigeration unit.

The hot box 16 shown, more clearly in FIG. 4, is typically suspended from the ceiling on one side of the refrigeration unit, as shown in FIGS. 1, 2, and 3. The hot box units are located on one side of the unit 16 opposite wall 30 of the refrigeration unit so that air is blown out and over the carcasses. As mentioned, the hot box 16 includes a cooling or refrigeration unit 26 and an exhaust fan 28. When in operation, the cooled air from unit 14 will be blown away from and through the fan 28 and out towards the carcasses, as shown in FIGS. 1 and 2. Any of a variety of hot boxes can be used in the refrigeration unit 10 as long as sufficiently cold air can be generated and the air can be blown away from the unit at a sufficient air speed to cool all the carcasses located in the refrigeration unit 10.

As was discussed, it is desired for the cool air to be blown in a circular motion, with the air traveling in an initial downward arc before moving vertically upward towards the hot box. FIGS. 1 and 2 more adequately illustrate the desired air flow. The desired air flow is achieved by placing the wall 12 in the refrigeration unit 10 so that the air is forced to follow the particular course shown in FIGS. 1 and 2. The space occupied by the wall 18 between the hot box 16 and floor 32 is dependent upon the distance between the hot box and the floor. It is preferred if a distance of about three (3) feet is left between the bottom of the wall 12 and the floor 32. Any distance can be permitted as long as sufficient air circulation occurs, whereby the air is not forced in an initial upward direction, thereby causing condensation formation on the ceiling 14. Essentially, the wall 12 forms a refrigeration unit having three side walls. The desired air flow is achieved by placing the wall 12 in a position whereby it seals or occupies the space between the hot box 16 and the ceiling of the refrigeration unit 14. Also, the space between multiple hot boxes should be sealed and most of the space between the hot box and the floor should be sealed, as shown in FIG. 4. By placing the wall 12 in position to occupy these spaces, the air is forced to follow the desired course. Thus, the wall 12 can be placed in any position in the refrigeration unit 10 as long as the air is circulated in the desired direction.

The wall 12 may have any of a variety of constructions and applications, as long as the desired course of air flow is achieved. Various permissible embodiments of the wall 12 are shown in FIGS. 1 and 2, as walls 34 and 36. Wall 34 is a substantially vertical wall that extends downward from the hot box unit. Conversely, wall 36 has a two part construction comprised of an angled member 38 which extends downwardly and at angle away from the hot box unit and a vertical member 40, which extends downward from the angled member 38 to a point midway between the hot box unit and the floor. The air flow caused by either wall 34 or 36 will allow for the carcasses to be cooled at a faster rate and substantially prevent condensation from collecting on the ceiling 14 of the refrigeration unit 10. Thus, the wall 12 will prevent airflow in a direction whereby the air initially moves in an upward vertical direction followed by a downward vertical direction. Instead, the wall forces the air in a downward direction followed by an upward direction.

Both walls 34 and 36 can be constructed from the same material, with such material being of a construction that prevents blood and animal waste from readily collecting or attaching to the wall. Any of a variety of materials can be used to form the wall, including plywood, wood, cork, and any of a variety of other materials. Preferably, the wall is laminated or coated with a material that prevents the ready attachment of animal waste. Additionally, the wall will include a support structure 42, which is designed to hold the wall 12 in place while permitting a space beneath the wall for the air to move through. The support structure 42 is best illustrated in FIG. 4 and is typically a bar, rod, or similar device that supports the wall. Any type of material can be used to form the support structure, as long as it is capable of holding the wall in position.

Thus, there has been disclosed a method and device for preventing condensation, re-directing airflow, and cooling animal carcasses in a lesser amount of time in a refrigeration unit. It is apparent to those skilled in the art, however, that many changes, variations, modifications, and other uses are possible, and also such changes, variations, modifications, and other uses and applications are deemed to be covered by the invention, which is limited only by the claims which follow.

What is claimed is:

1. A method for reducing condensation, redirecting airflow, and cooling animal carcasses in a refrigeration unit whereby the refrigeration unit has separate devices for cooling the refrigeration unit, comprising placing a wall in a position that contacts the devices for cooling and occupies space between the devices and the refrigeration unit's ceiling, space between multiple units of the devices, and part of the space between the devices and the refrigeration unit's floor, said wall includes supports extending up from the floor, which attach to said wall's bottom portion, and hold said wall in place, which will result in a circular airflow whereby the air initially moves in a downward direction.

2. The method of claim 1 wherein the air flows away from the devices over the carcasses and back to the devices in a circular motion.

3. The method of claim 1 wherein said wall is formed from plywood, wood, cork, and any of a variety of other materials that are laminated or coated with a material that prevents the ready attachment of animal waste.

4. A wall designed to redirect airflow in a refrigeration system comprising cooling units suspended from a ceiling, wherein said wall is placed in a position to contact the cooling units, with supports extending up from the floor to hold and support said wall, with said wall causing the air to flow in a circular motion, with the air initially flowing downward.

5. The wall of claim 4 wherein said wall occupies space between the cooling unit and the ceiling, between the cooling units, and a portion of space between the cooling units and floor.

6. The wall of claim 4 wherein said wall is a vertical member.

7. The wall of claim 4 wherein said wall includes an angled member and a vertical member attached to one another.

8. The refrigeration unit of claim 7 wherein said refrigeration unit is of a rectangular construction and includes a pair of opposed side walls and a pair of opposed end walls, with said cooling units located proximal to one of said side walls.

9. The wall of claim 4 wherein said wall is formed from plywood, wood, cork, and any of a variety of other materials that are laminated or coated with a material that prevents the ready attachment of animal waste.

10. A refrigeration unit designed to cause air flow in said refrigeration unit to flow in a circular motion with the air initially flowing downward, comprising a room having cooling units suspended from said room's ceiling, with said cooling units blowing the air in a direction designed to travel either length-wise or width-wise across said room, and having an additional wall located in a position whereby said wall is in vertical contact with said cooling units so that space between said cooling units and said room's ceiling is blocked by said wall, with supports extending up from the floor to hold and support said wall.

* * * * *

UNITED STATES PATENT AND TRADEMARK OFFICE
CERTIFICATE OF CORRECTION

PATENT NO. : 6,266,973 B1  Page 1 of 1
APPLICATION NO. : 09/474495
DATED : July 31, 2001
INVENTOR(S) : James Clyde Salmons It is certified that error appears in the above-identified patent and that said Letters Patent is hereby corrected as shown below:

Col. 6 Line 33
Correct Claim 9 by re-numbering Claim 9 to Claim 8;

Col. 6 Line 38
Correct Claim 10 by re-numbering Claim 10 to Claim 9;

Col. 6
Correct Claim 8 by re-numbering Claim 8 to Claim 10, and in line 1 of Claim 8, delete "7" and insert --9--, therefor.

Signed and Sealed this

Eighth Day of April, 2008

JON W. DUDAS
*Director of the United States Patent and Trademark Office*